United States Patent
Miyata

(10) Patent No.: US 10,713,638 B2
(45) Date of Patent: Jul. 14, 2020

(54) ELECTRONIC RECEIPT SYSTEM, ELECTRONIC RECEIPT CENTER, CLEARANCE PREDICTION INFORMATION MANAGEMENT METHOD, AND NON-TRANSITORY COMPUTER READABLE MEDIUM HAVING CLEARANCE INFORMATION MANAGEMENT PROGRAM STORED THEREON

(71) Applicant: NEC Platforms, Ltd., Kawasaki-shi, Kanagawa (JP)

(72) Inventor: Kotaro Miyata, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 78 days.

(21) Appl. No.: 16/094,389

(22) PCT Filed: Apr. 4, 2017

(86) PCT No.: PCT/JP2017/014045
§ 371 (c)(1),
(2) Date: Oct. 18, 2018

(87) PCT Pub. No.: WO2017/183440
PCT Pub. Date: Oct. 26, 2017

(65) Prior Publication Data
US 2019/0130378 A1    May 2, 2019

(30) Foreign Application Priority Data
Apr. 19, 2016    (JP) .................. 2016-083569

(51) Int. Cl.
*G06Q 20/20*    (2012.01)
*G06Q 20/38*    (2012.01)
(Continued)

(52) U.S. Cl.
CPC ....... *G06Q 20/209* (2013.01); *G06Q 20/0453* (2013.01); *G06Q 20/3224* (2013.01);
(Continued)

(58) Field of Classification Search
CPC ............... G06Q 30/06; G06Q 20/0453; G06Q 30/0238; G06Q 20/387; G06Q 20/209; G06Q 20/3224
(Continued)

(56) References Cited

U.S. PATENT DOCUMENTS 8,606,642 B2 * 12/2013 Siounis .............. G06Q 30/0643
705/26.1
8,931,039 B2 * 1/2015 Raup ..................... G06F 19/324
726/1
(Continued)

FOREIGN PATENT DOCUMENTS

JP    2000-339544 A    12/2000
JP    2004-362470 A    12/2004
(Continued)

OTHER PUBLICATIONS

Kakaku.com "Discount notification mail" "http://help.kakaku.com/cgi-bin/mt/mt-search.cgi?search=%E5%80%A4%E4%B8%8B%E3%81%8C%E3%82%8A%E3%81%8A%E7%9F%A5%E3%82%89%E3%81%9B%E3%83%A1%E3%83%BC%E3%83%AB&IncludeBlogs=3&limit=20&SearchResultDisplay=ascend&btnSearch.x=23&btnSearch.y=14", Jul. 5, 2018, 2 pages.
(Continued)

*Primary Examiner* — Andrew Joseph Rudy
(74) *Attorney, Agent, or Firm* — Sughrue Mion, PLLC

(57) ABSTRACT

A POS device generates an electronic receipt in a format to which including clearance information indicating discount, and makes an electronic receipt center store the electronic receipt. When the electronic receipt center receives inquiry
(Continued)

whether or not there is a store predicted to sell a clearance goods of a goods field designated among stores existing near a current location from a mobile terminal. The electronic receipt center searches the electronic receipt stored, and extracts an electronic receipt for the purchased clearance goods of a goods field designated at a store existing near the current location of the mobile terminal.

10 Claims, 17 Drawing Sheets

(51) Int. Cl.
  *G06Q 20/04* (2012.01)
  *G06Q 20/32* (2012.01)
  *G06Q 30/06* (2012.01)
  *G06Q 30/02* (2012.01)
(52) U.S. Cl.
  CPC ....... *G06Q 20/387* (2013.01); *G06Q 30/0238* (2013.01); *G06Q 30/06* (2013.01)
(58) Field of Classification Search
  USPC ................ 705/14.1, 14.23, 23, 24, 26.1; 235/377–383
  See application file for complete search history.

(56) References Cited

U.S. PATENT DOCUMENTS

| | | | | |
|---|---|---|---|---|
| 9,002,728 | B2* | 4/2015 | Carpenter | G06Q 30/0229 |
| | | | | 705/14.1 |
| 9,846,867 | B2* | 12/2017 | Chauhan | G06Q 20/202 |
| 2004/0064373 | A1* | 4/2004 | Shannon | G06Q 20/0453 |
| | | | | 705/24 |
| 2010/0257066 | A1 | 10/2010 | Jones et al. | |
| 2014/0100931 | A1* | 4/2014 | Sanchez | G06Q 20/40 |
| | | | | 705/14.23 |

FOREIGN PATENT DOCUMENTS

| | | |
|---|---|---|
| JP | 2008-059512 A | 3/2008 |
| JP | 2011-524051 A | 8/2011 |
| JP | 2013-200857 A | 10/2013 |
| JP | 2014-516180 A | 7/2014 |
| JP | 2014-194730 A | 10/2014 |
| JP | 2015-149080 A | 8/2015 |

OTHER PUBLICATIONS

International Search Report PCT/JP2017/014045 dated Jun. 13, 2017 [PCT/ISA/210].

* cited by examiner

| | | | | |
|---|---|---|---|---|
| 1 | B.JPG | | | |
| 2 | null | | | |
| 3 | △△△ DAILY FOOD | 236g | | |
| 4 |   | LIMITED-TIME SALE | @128 | 302 |
| 5 | null | | | |
| 6 | CHICKEN BREAST MEAT | 298 | ↓ | |
| 7 | 30% | 89- | | |
| 8 | sen.jpg | | | |
| 9 | SHOPPING BAG DISCOUNT | ¥2 | | |
| 10 | TOTAL | ¥509 | | |
| 11 | REGISTER 113 | 2012/9/24 | (MONDAY) | 09:51 |
| 12 | HANDLING NUMBER: | #16414 | CASHIER: | ×××× |
| 13 | | | | |
| 14 | | | | |

Fig. 6A

Fig. 7
(A)
(B)
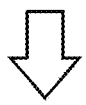 
(C)
(D)

| STORE NAME | SPECIFIC DAY NAME | DISCOUNT RATE | EVENT DATE | | |
|---|---|---|---|---|---|
| STORE B | APPRECIATION DAY | 5% | 20TH | 30TH | |
| STORE A | HAPPY DAY | 5% | 8TH | 18TH | 28TH |
| | | | | | |

| DIVISION | GOODS NAME | NET PRICE | PURCHASE PRICE | DISCOUNT AMOUNT | DISCOUNT RATE | UNIT PRICE |
|---|---|---|---|---|---|---|
| DAILY FOOD | △△△DAILY FOOD | | 302 | | | 128 |
| MEAT | CHICKEN BREAST MEAT | 298 | | 89 | 30 | |

DISCOUNT RATE IS UNKNOWN (A2) 2015/10/10

| DIVISION | GOODS NAME | NET PRICE | PURCHASE PRICE | DISCOUNT AMOUNT | DISCOUNT RATE | UNIT PRICE |
|---|---|---|---|---|---|---|
| DAILY FOOD | △△△DAILY FOOD | 633 | | 318 | 50 | 92 |
| LIQUOR | ○○○○ | | 1002 | | | |

(A3) 2015/6/8

| DIVISION | GOODS NAME | NET PRICE | PURCHASE PRICE | DISCOUNT AMOUNT | DISCOUNT RATE | UNIT PRICE |
|---|---|---|---|---|---|---|
| DAILY FOOD | △△△DAILY FOOD | | | | 0 | |

UNIT PRICE 92 YEN/DISCOUNT RATE 50% ≒ 184 YEN
100% − 128 YEN/184 YEN ≒ 30% DISCOUNT (B)

(B1) 2015/2/6

| DIVISION | GOODS NAME | NET PRICE | PURCHASE PRICE | DISCOUNT AMOUNT | DISCOUNT RATE | UNIT PRICE |
|---|---|---|---|---|---|---|
| DAILY FOOD | △△△DAILY FOOD | | 302 | | 30 | 128 |
| MEAT | CHICKEN BREAST MEAT | 298 | | 89 | 30 | |

(B2) 2015/10/10

| DIVISION | GOODS NAME | NET PRICE | PURCHASE PRICE | DISCOUNT AMOUNT | DISCOUNT RATE | UNIT PRICE |
|---|---|---|---|---|---|---|
| DAILY FOOD | △△△DAILY FOOD | 633 | | 318 | 50 | 92 |
| LIQUOR | ○○○○ | | 1002 | | | |

(B3) 2015/6/8

| DIVISION | GOODS NAME | NET PRICE | PURCHASE PRICE | DISCOUNT AMOUNT | DISCOUNT RATE | UNIT PRICE |
|---|---|---|---|---|---|---|
| DAILY FOOD | △△△DAILY FOOD | | | | 0 | |

| TIME ZONE | 2015/6/8 | 2015/9/24 | 2015/10/10 |
|---|---|---|---|
| 10 | | | |
| 11 | | | |
| 12 | | | |
| 13 | | | |
| 14 | | | |
| 15 | | | |
| 16 | 0 | | |
| 17 | | | |
| 18 | | | |
| 19 | | 30 | |
| 20 | | | |
| 21 | | | 50 |

Fig. 14

| TIME ZONE | DAILY FOOD | 2015/6/8 | 2015/9/24 | 2015/10/... |
|---|---|---|---|---|
| 10 | 0 | | | |
| 11 | 0 | | | |
| 12 | 0 | | | |
| 13 | 0 | | | |
| 14 | 30 | | | |
| 15 | 30 | | | |
| 16 | 0 | 0 | | |
| 17 | 0 | | | |
| 18 | 0 | | | |
| 19 | 30 | | 30 | |
| 20 | 30 | | | |
| 21 | 50 | | | |

| TIME ZONE | SASHIMI | MEAT | VEGETABLE |
|---|---|---|---|
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 30 | 30 | 50 |
| 20 | 50 | 0 | SOLD OUT |
| 21 | SOLD OUT | 0 | SOLD OUT |

Fig. 16

ELECTRONIC RECEIPT SYSTEM, ELECTRONIC RECEIPT CENTER, CLEARANCE PREDICTION INFORMATION MANAGEMENT METHOD, AND NON-TRANSITORY COMPUTER READABLE MEDIUM HAVING CLEARANCE INFORMATION MANAGEMENT PROGRAM STORED THEREON

CROSS REFERENCE TO RELATED APPLICATIONS

This application is a National Stage of International Application No. PCT/JP2017/014045 filed Apr. 4, 2017, claiming priority based on Japanese Patent Application No. 2016-083569 filed on Apr. 19, 2016, the entire contents of which are incorporated by reference herein.

TECHNICAL FIELD

The present invention relates to an electronic receipt system, an electronic receipt center, a clearance prediction information management method and a non-transitory computer readable medium having a clearance prediction information management program stored thereon which are useful to efficiently provide so-called clearance sale information for discounting prices of goods such as perishable foods and selling the goods to clients.

BACKGROUND ART

When selling prices of goods put on store counters are set, a clearance sale for cutting selling prices of perishable foods in particular in view of their expiration dates, discounting the prices and then selling the perishable foods is widely performed. An appropriate time for a store to start a clearance sale of perishable foods changes according to various conditions such as a day of a week, weather, a season and a temperature. A time to start a clearance sale is not fixed due to such a situation. Therefore, it is not easy for a client who purchases perishable foods from a store to efficiently find and purchase clearance foods (see Patent Literature 1).

Generally, there is service for transmitting information indicating that "you have discount prices" from store to clients when goods are sold at clearance prices, i.e., discount prices. For example, there is a "discount notification mail" provided as Web service of the Internet by Kakaku.com, Inc. (Kakaku.com is the registered trademark) (see Non-Patent Literature 1). By using such mail service, a client can learn information related to clearance goods, and use the information to purchase desired goods.

CITATION LIST

Patent Literature

PTL 1: Japanese Unexamined Patent Application Publication No. 2000-339544
PTL 2: Published Japanese Translation of PCT International Publication for Patent Application, No. 2011-524051

Non Patent Literature

NPL 1: Kakaku.com "Discount notification mail" "http://help.kakaku.com/cgi-bin/mt/mt-search.cgi?search=%E5%80%A4%E4%B8%8B%E3%81%8C%E3%82%8A%E3%81%8A%E7%9F%A5%E3%82%89%E3%81%9B%E3%83%A1%E3%83%BC%E3%83%AB&IncludeBlogs=3&limit=20&SearchResultDisplay=ascend&btnSearch.x=23&btnSearch.y=14"

SUMMARY OF INVENTION

Technical Problem

However, in a case of perishable foods in particular, a time during which a clearance and a sellout is short. Therefore, there is a problem that, even when discount information can be acquired from a mail and, for example, the "discount notification mail" is received, if a client who has received the mail is not near a corresponding store, the perishable foods are sold out before the client can move to the store.

Furthermore, when goods are purchased at a store, conventionally, information related to a receipt and other types of commercial transactions are recorded on paper media, and then provided to clients. However, due to development of electronic commerce, receipt data is usually digitized, and then the receipt data as electronic data is provided to clients (see Patent Literature 2 disclosed in [Citation List]).

(Object of Present Invention)

The present invention has been made in light of the above situation. An object of the present invention is to provide an electronic receipt system, an electronic receipt center, a clearance prediction information management method and a non-transitory computer readable medium having a clearance prediction information management program stored thereon which can efficiently present information related to clearance goods to clients by using electronic receipts.

Solution to Problem

In order to solve the above-described problem, an electronic receipt system, an electronic receipt center, a clearance prediction information management method and a clearance prediction information management program according to the present invention mainly have the following characteristic configurations, respectively.

(1) An electronic receipt system according to the present invention includes;
a mobile terminal owned by a client;
a point of sales (POS) device installed at a store; and
an electronic receipt center, wherein
the POS device being configured to generate receipt information related to purchased goods purchased by the client at the store as a digitized electronic receipt, and transmit the electronic receipt to the electronic receipt center, and
the electronic receipt center being configured to store the received electronic receipt, and, when receiving a transmission request of the electronic receipt from the mobile terminal of the client, transmit the stored electronic receipt related to the client to the mobile terminal of a request source, wherein
the POS device generates the electronic receipt in a format to which clearance information indicating that goods sold at a price discounted from a net price is clearance goods is further added, and
when receiving from the mobile terminal of the client a clearance prediction information inquiry for inquiring whether or not there is a store predicted to sell the clearance goods among stores existing near a current location, the electronic receipt center
searches the electronic receipt stored previously, and extracts an electronic receipt for the purchased clearance goods at a store existing near the current location of the mobile terminal of an inquiry source, and generates clearance prediction information from the extracted electronic receipt, and transmits the clearance prediction information to the mobile terminal of the inquiry source.

(2) An electronic receipt center according to the present invention, included in an electronic receipt system includes; a mobile terminal owned by a client; and a point of sales device (POS) device installed at a store, wherein when the POS device generates receipt information related to purchased goods purchased by the client at the store as a digitized electronic sheet, and generates and transmits the electronic receipt in a format to which clearance information indicating that goods sold at a price discounted from a net price is clearance goods is further added, the electronic receipt center receives and stores the transmitted electronic receipt, and when receiving from the mobile terminal of the client a clearance prediction information inquiry for inquiring whether or not there is a store predicted to sell the clearance goods among stores existing near a current location, the electronic receipt center searches the electronic receipt stored previously, and extracts an electronic receipt for the purchased clearance goods at a store existing near the current location of the mobile terminal of an inquiry source, and generates clearance prediction information from the extracted electronic receipt, and transmits the clearance prediction information to the mobile terminal of the inquiry source.

(3) A clearance prediction management method according to the present invention, for generating and managing clearance prediction information indicating that clearance goods discounted at a store is predicted to be sold, by using an electronic receipt system, the electronic receipt system including: a mobile terminal owned by a client; a point of sales (POS) device installed at a store; and an electronic receipt center on a cloud, the POS device being configured to generate receipt information related to purchased goods purchased by the client at the store as a digitized electronic receipt, and transmit the electronic receipt to the electronic receipt center, and the electronic receipt center being configured to store the received electronic receipt, and, when receiving a transmission request of the electronic receipt from the mobile terminal of the client, transmit the stored electronic receipt related to the client to the mobile terminal of a request source, the clearance prediction management method including:

at the POS device, generating the electronic receipt in a format to which clearance information indicating that goods sold at a price discounted from a net price is clearance goods is further added; and at the electronic receipt center, when receiving from the mobile terminal of the client a clearance prediction information inquiry for inquiring whether or not there is a store predicted to sell the clearance goods among stores existing near a current location, searching the electronic receipt stored previously, and extracting an electronic receipt for the purchased clearance goods at a store existing near the current location of the mobile terminal of an inquiry source, and generating clearance prediction information from the extracted electronic receipt, and transmitting the clearance prediction information to the mobile terminal of the inquiry source.

(4) A clearance prediction information management program according to the present invention, configured to carry out the clearance prediction information management method according to the above-mentioned (3) as a program that can be executed by a computer.

Advantageous Effects of Invention

The electronic receipt system, the electronic receipt center, the clearance prediction information management method and the clearance prediction information management program according to the present invention can provide the following effects.

That is, by operating a mobile terminal and transmitting an inquiry to the electronic receipt center of the electronic receipt system, a client who tries to purchase clearance goods can predict at what discount rate the clearance goods are sold at nearby stores existing in a range close to a current location of the client, and have a reply with clearance prediction information, so that it is possible to efficiently purchase the clearance goods.

BRIEF DESCRIPTION OF DRAWINGS

FIG. 6A is explanatory views illustrating an example of a general data format of the electronic receipt transmitted from the POS device illustrated in FIG. 1 to the electronic receipt center, and illustrates the example of the print data taking the format which can be printed by the receipt printer.

FIG. 7 is a schematic view illustrating an example where new information related to clearance information is additionally registered to electronic receipt information accumulated in the electronic receipt center by operating the mobile terminal illustrated in FIG. 1.

FIG. 8 illustrates a table illustrating an example of setting information related to a specific day decided as a special day for discount at each store.

FIG. 13 illustrates an example of a plurality of pieces of collected electronic receipt information of target clearance goods such as daily food.

FIG. 14 is an explanatory view illustrating an example where a discount rate of each time zone is classified per date, weather and temperature range of clearance goods of each target store and each goods division.

FIG. 16 illustrates a list table illustrating an example where a final discount rate of each time zone is listed per season, weather and temperature range of clearance goods of each target store and each goods division.

DESCRIPTION OF EMBODIMENTS

Figure 1:
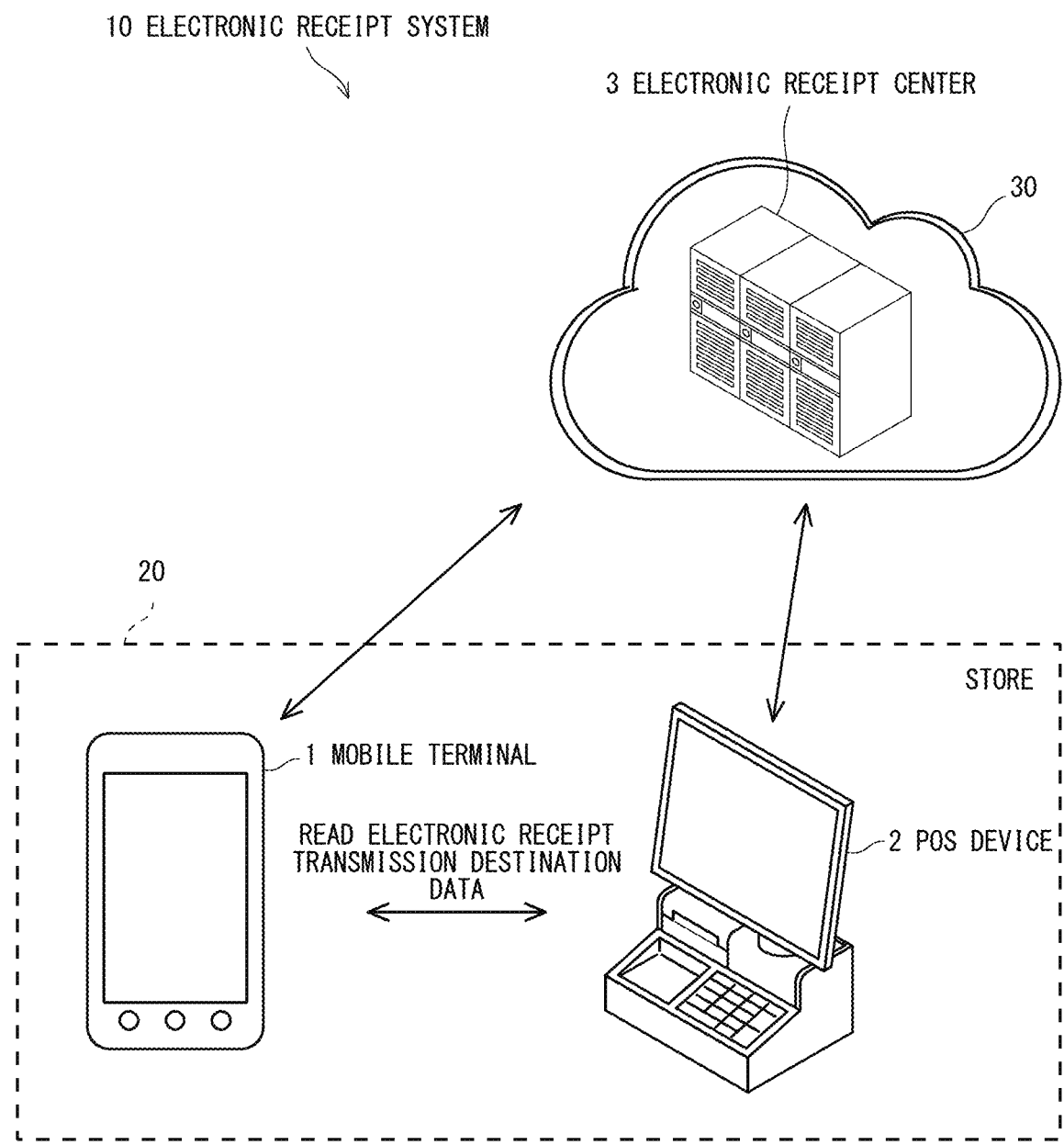
FIG. 1 is the system configuration diagram for explaining the system configuration example of the electronic receipt system according to the present invention.

Hereinafter, a preferred embodiment of an electronic receipt system, an electronic receipt center, a clearance prediction information management method and a clearance prediction information management program according to the present invention will be described with reference to the accompanying drawings. In addition, the electronic receipt system, the electronic receipt center and the clearance prediction information management method according to the present invention will be described below. Naturally, this clearance prediction information management method may be carried out as a clearance prediction information management program which can be executed by a computer, or the clearance prediction information management program may be recorded in a computer readable recording medium. Furthermore, each drawing reference numeral assigned in each of the following drawings is assigned to each component for ease of convenience to help understanding, and does not intend to limit the present invention to illustrated aspects.

(Features of Present Invention)

Prior to giving a description of the embodiment of the present invention, an outline of the features of the present invention will be described first. The main features of the present invention include that, when a client who tries to purchase goods, uses a mobile terminal of the client to access the electronic receipt center and inquire whether or not there are stores predicted to sell clearance goods, a time zone in which prices of goods of a designated goods field become clearance prices, and a discount rate are predicted for each of one or a plurality of stores located near a current location acquired from position information of the client, based on a past purchase history acquired from electronic receipts accumulated in the electronic receipt center, and clearance goods and a discount rate existing in a time zone close to the current time are displayed as clearance prediction information on a screen of the mobile terminal of the client. Consequently, the client can move to a store existing nearby store and efficiently purchase clearance goods based on the information displayed on the mobile terminal.

That is, the main features of the present invention include that information of each store related to clearance sale of each goods field per time zone of each day of a week in each month is extracted from multiple pieces of electronic receipt information of past business transactions accumulated in the electronic receipt center, information (e.g., goods and a discount rate) which is related to a goods field designated by a client for each store, and which matches with a current season and is related to clearance sale on the same day as today (at the same temperature on the same weather of today) and in a time zone close to a current time is predicted as clearance prediction information based on the extracted information, a source of a request for acquiring the clearance prediction information is notified of the information Embodiment of Present Invention Next, an example of the embodiment according to the present invention will be described in detail with reference to the drawings. As described above, Patent Literature 1 and so one proposes an electronic receipt system which accumulates goods purchase information in a cloud server (an electronic receipt center and a receipt store), and manages the purchase information. Purchase information of goods purchased in the past by multiple clients at multiple stores is accumulated together with information of a purchase date and a purchase day in addition to discount information, i.e., clearance information in the server (the electronic receipt center and the receipt store) of the electronic receipt system. Furthermore, the past goods purchase information accumulated in the server (the electronic receipt center and the receipt store) can be transmitted to a device of a request source client such as a mobile terminal in response to an acquisition request from the client.

The present invention provides a mechanism which refers to discount information of each store and goods included in the above multiple pieces of past electronic receipt information collected and accumulated in the electronic receipt system and predicts a clearance start time, a clearance end time (goods sold-out time) and a discount rate of each store and goods by taking into account conditions such as a date, a season, a day of a week, a weather and a temperature to present to clients.

(Configuration Example of Embodiment)

Next, a system configuration example of an electronic receipt system according to the present invention will be described with reference to a system configuration diagram of FIG. 1. FIG. 1 is the system configuration diagram for explaining the system configuration example of the electronic receipt system according to the present invention.

An electronic receipt system 10 illustrated in FIG. 1 includes a mobile terminal 1 which is carried by a client, a POS device 2 which is installed in a store 20, and an electronic receipt center 3 which exists on a cloud 30.

In this regard, the mobile terminal 1 is a client device carried by the client, and is configured like any terminal device such as a mobile telephone, a smartphone or a portable calculator. The mobile terminal 1 holds information such as electronic money or a credit card number for a payment related to purchased goods, transmission destination address information of an electronic receipt for the client in the electronic receipt center 3, and other profile information. Furthermore, the mobile terminal 1 includes a transmission/reception unit which transmits and receives information between the mobile terminal 1 and the POS device 2 installed in the store 20, or between the mobile terminal 1 and the electronic receipt center 3 on the cloud 30.

The mobile terminal 1 can perform payment processing by communicating with the POS device 2 in the store 20, and transmitting the information such as the electronic money and the credit card number held in the mobile terminal 1, transmission destination address information of the electronic receipt for the client in the electronic receipt center 3, and the other profile information to the POS device 2. Furthermore, the mobile terminal 1 can acquire information of the electronic receipt by communicating with the electronic receipt center 3 and accessing a transmission destination address of an electronic receipt related to the client. Furthermore, the mobile terminal 1 has a function of sending an inquiry to the electronic receipt center 3 as to whether or not it is predicted that clearance goods related to a goods field designated by stores located near a current location are to be sold (i.e., sending an inquiry about clearance prediction information), and displaying an inquiry result on the screen.

The POS device 2 is a device formed by integrating a POS component and a device reader disclosed in Patent Literature 1. However, the POS device 2 is not limited to such a mode, and adopts a mode that the POS component and the device reader are separated similar to Patent Literature 1. The POS device 2 is installed in the store 20, and has a function of performing payment processing of purchased goods purchased by the client, generating an electronic receipt acquired by digitizing receipt information related to the purchased goods, and transmitting the electronic receipt to the electronic receipt center 3 on the cloud 30. Furthermore, the electronic receipt includes information indicating that goods discounted from net prices are clearance goods, in addition to a store name, a goods field, a goods name, a purchase date, a purchase time, the number of purchased items, and a purchase amount (unit prices and a total price). In addition, the present embodiment will describe information included in the electronic receipt below.

Furthermore, the POS device 2 acquires the information such as the electronic money or the credit card number for payment of the purchased goods, the transmission destination address information of the electronic receipt for the client in the electronic receipt center 3, and the other profile information from the mobile terminal 1 of the client who has visited the store 20 to use for payment processing and electronic receipt generation processing. In addition, an electronic receipt generating method of the POS device 2 needs to generate an electronic receipt according to substantially the same procedure as that of Patent Literature 1, and therefore overlapping descriptions will be omitted.

The electronic receipt center 3 has a function of storing electronic receipts transmitted from the POS device 2, and providing various types of service in response to an access from the mobile terminal 1 of the client. The electronic receipt center 3 has a function of, when, for example, receiving a clearance prediction information inquiry from the client, referring to an electronic receipt indicating an accumulated past purchase history, and transmitting to the inquiry source mobile terminal 1 clearance prediction information including at least a store which is predicted to sell goods of a designated goods field as clearance goods within a predetermined time range from a current time, clearance predicted goods and predicted discount rates at stores near a current location of the client. A function of generating the clearance prediction information and returning the clearance prediction information to the inquiry source may be realized as a clearance prediction information management program by a program logic.

In addition, inquiry information from the mobile terminal 1 of the client includes information related to a current location of the client acquired by a GPS function, and information related to a goods field of clearance goods which need to be purchased. Furthermore, the predetermined time range from the current time may be defined as, for example, a time range required to move from a current place of the inquiry source client.

Hence, the electronic receipt center 3 has a function of extracting goods of a clearance sale from an electronic receipt transmitted from each of the multiple POS devices 2, adding and organizing conditions such as a season, a month, a week, a day of a week, a time zone (including a time zone including a clearance sale start, a clearance sale end and a sold-out time, too), weather and a temperature, and generating clearance prediction information including at least prediction clearance goods and a prediction discount rate per goods field of each store. In addition, as the electronic receipt management method of the electronic receipt center 3, an electronic receipt management method of a receipt store disclosed in Patent Literature 1 can be used.

Furthermore, the electronic receipt center 3 has a function of, when receiving a clearance prediction information inquiry from the mobile terminal 1, receiving GPS information indicating a current location (current place information) of the client, and searching stores near the current location of the client.

Furthermore, the electronic receipt center 3 has a function of, when receiving movement destination (e.g., a client's house) position information from the mobile terminal 1, and searching past purchase history information from the accumulated electronic receipt information, extracting electronic receipts of stores existing on a movement route (e.g., a homecoming route) from the current location of the client to the movement destination (e.g., home) of the client as stores existing near the current location of the client. To secure accuracy of such a movement route, the electronic receipt center 3 may receive not only GPS information which indicates the current location and movement destination information, but also route information from the current location to the movement destination from the mobile terminal 1 upon an inquiry from the mobile terminal 1. Furthermore, when searching stores existing near the current location of the client, the electronic receipt center 3 may search stores in order from a store closest to the current location of the client or preferentially search a store at which the client previously has purchased goods.

Figure 2:
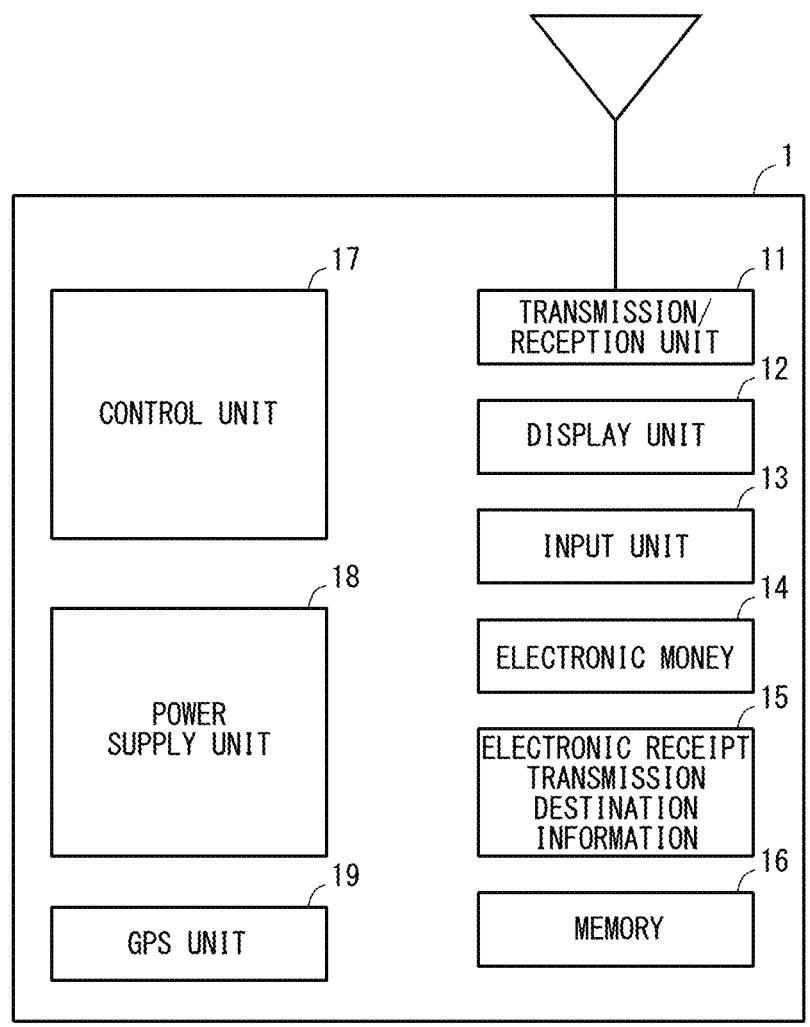
FIG. 2 is the block configuration diagram illustrating an example of the internal configuration of the mobile terminal which composes the electronic receipt system illustrated in FIG. 1.

Next, an internal configuration of the mobile terminal 1 carried by the client will be described with reference to a block configuration diagram in FIG. 2. FIG. 2 is the block configuration diagram illustrating an example of the internal configuration of the mobile terminal 1 which composes the electronic receipt system 10 illustrated in FIG. 1.

The mobile terminal 1 illustrated in FIG. 2 includes at least a transmission/reception unit 11, a display unit 12, an input unit 13, electronic money information 14, electronic receipt transmission destination information 15, a memory 16, a control unit 17, a power supply unit 18, and a global positioning system (GPS) unit 19.

The transmission/reception unit 11 has a function of performing wireless communication or wired communication with the POS device 2 and with the electronic receipt center 3. A mode of the wireless communication supports various wireless communication methods such as wireless LAN, Wi-Fi and NFC. Furthermore, the display unit 12 has the function of displaying various types of service on the screen for the client. For example, as described below in detail, the display unit 12 can also display a clearance prediction information screen including clearance prediction information (information including at least clearance predicted goods and a predicted discount rate) received from the electronic receipt center 3 on the screen. Furthermore, the display unit 12 is a touch panel type display screen, and the client can touch the screen by a finger and perform a tapping (or clicking) operation or a drag & drop operation.

Furthermore, the input unit 13 can instruct or select a specific operation or input a text by performing various screen operations via the above touch panel. Furthermore, the input unit 13 can input a specific instruction by a button operation. Furthermore, the input unit 13 can input images and moving images by using a built-in camera function. Furthermore, the input unit 13 can import as input information a command received from outside (e.g., the POS device 2 or the electronic receipt center 3) via the transmission/reception unit 11.

Furthermore, the electronic money information 14 is information accumulated in advance as information for payment of purchased goods, yet may be stored as a credit card number. The electronic money information 14 is information transmitted as profile information including payment information to purchase goods to the POS device 2. Furthermore, the electronic receipt transmission destination information 15 is information indicating a transmission destination of an electronic receipt for the client in the electronic receipt center 3, and is information transmitted as profile information to the POS device 2 to purchase goods. The electronic receipt transmission destination information 15 is used to access the electronic receipt center 3 to acquire an electronic receipt related to the client.

Furthermore, the memory 16 stores electronic receipt information and clearance prediction information received from the electronic receipt center 3, holds a clearance prediction information screen displayed on the screen of the display unit 12 or stores a program (application program) such as a clearance prediction information display program, and is used to temporarily store various pieces of operation information.

Furthermore, the control unit 17 has a function of controlling an entire operation of the mobile terminal 1, and controls execution of various programs such as a clearance prediction information display program in the first place stored in the memory 16. Furthermore, the control unit 17 receives a command transmitted via the transmission/reception unit 11, and controls an operation corresponding to instruction contents of the command. The power supply unit 18 supplies power to each component of the mobile terminal 1, and uses a rechargeable battery such as a lithium ion battery.

Furthermore, the GPS unit 19 has a function of acquiring a current position of the mobile terminal 1. The GPS unit 19 has an A-GPS (auxiliary GPS) mounted on a normal mobile telephone or a smartphone.

Figure 3:
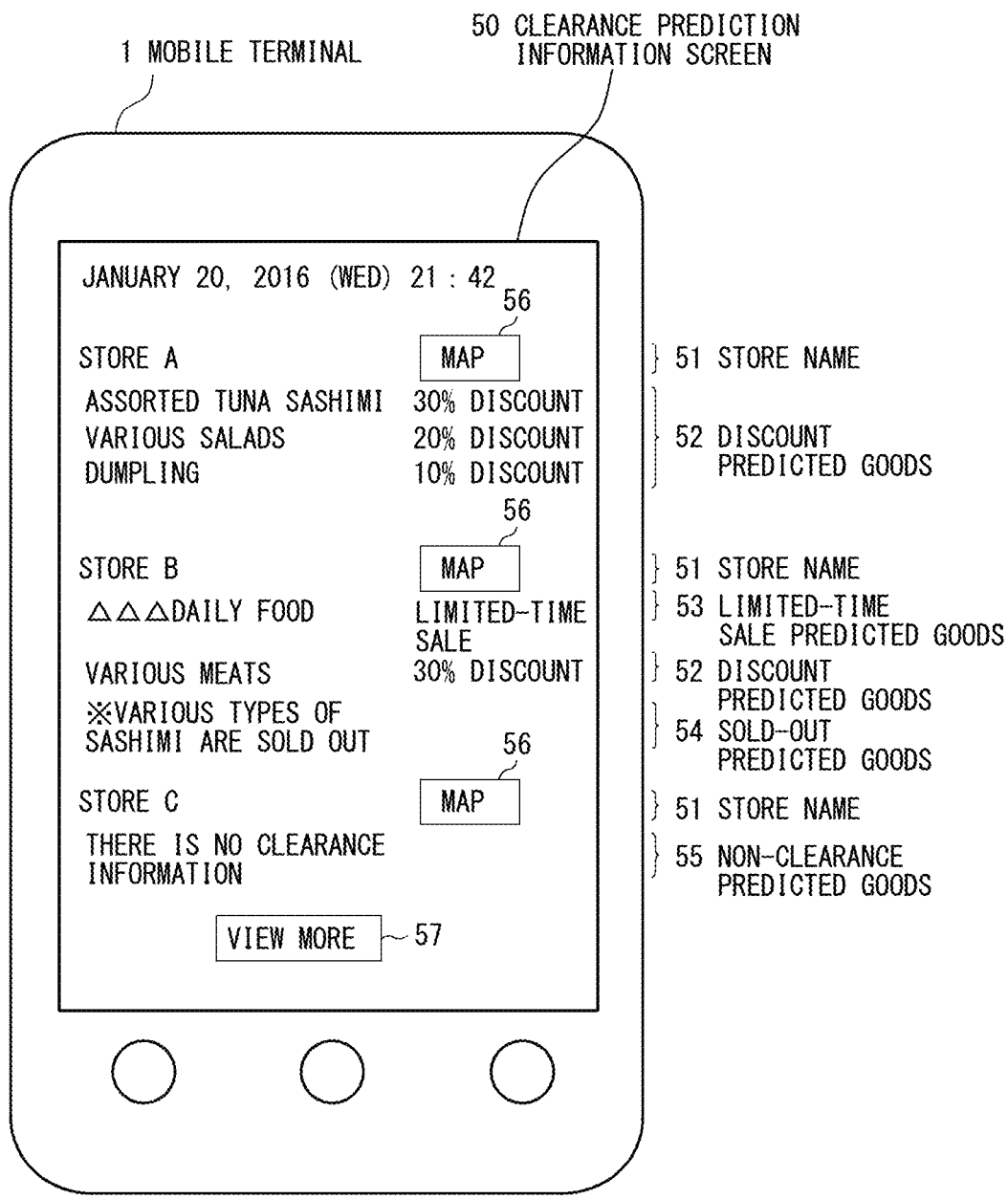
FIG. 3 is a schematic view illustrating an example of the clearance prediction information screen displayed on the screen of the display unit of the mobile terminal of the electronic receipt system illustrated in FIG. 1.

Next, an example of the clearance prediction information screen displayed on the display unit 12 of the mobile terminal 1 owned by the client will be described with reference to FIG. 3. FIG. 3 is a schematic view illustrating an example of the clearance prediction information screen displayed on the screen of the display unit 12 of the mobile terminal 1 of the electronic receipt system 10 illustrated in FIG. 1. As illustrated in FIG. 3, a clearance prediction information screen 50 displays information indicating that there are goods which it is predicted will start to be sold as clearance goods within a predetermined time from a current time, information indicating that there are clearance goods yet there are goods which it is predicted will not start to be sold within a predetermined time from the current time, or information related to sold-out goods and indicating that goods predicted to be clearance goods have already been sold out at each store existing near the current location of the client.

In this regard, specific display contents of the clearance prediction information screen 50 illustrated in FIG. 3 are a display example in a case where a client going home from work gets off at the closest station to his/her home, and then sends an inquiry to the electronic receipt center 3 about purchasing side dishes for dinner that night from clearance goods. That is, the display example indicates a case where the mobile terminal 1 owned by the client sends an inquiry to the electronic receipt center 3 as to GPS information indicating the current location (current position information) of the client, and whether or not there are stores which it is predicted will sell clearance goods related to side dishes as a goods field among stores existing near the current location of the client, and, as a result, the electronic receipt center 3 returns clearance prediction information.

In this regard, the stores existing near the current location mean stores existing within a range of a predetermined distance from the current location, and may be, for example, stores existing on a homecoming route from the current location of the client to home or stores on a movement route from the current location of the client to a movement destination designated arbitrarily by the client. In a case of the stores existing on the homecoming route, the electronic receipt center 3 may search past purchase history information of the client, and regard stores at which the client has previously purchased goods among the stores existing near the current location of the client as the stores existing on the homecoming route of the client. Alternatively, when an inquiry is made to the electronic receipt center 3, not only current location information but also position information of home are transmitted or route information indicating a homecoming route from the current location to home may be transmitted to inquire whether clearance goods are predicted to be sold at stores on the homecoming route.

In addition, as described above, the electronic receipt center 3 has a function of accumulating multiple electronic receipts transmitted from the POS device 2 of each store 20, extracting goods of clearance sale from the multiple electronic receipts as described above, and generating clearance prediction information including a predicted discount rate of each goods of each goods field of each store in addition to conditions such as the season, the month, the week, the day of the week, the clearance start time, the clearance end time (clearance goods sold-out time), the weather and the temperature. In addition, the information included in the clearance prediction information may display not only a predicted discount rate but also a predicted selling price depending on cases.

The clearance prediction information screen 50 in FIG. 3 illustrates that, when, for example, a store name 51 is a store A, there are clearance predicted goods, i.e., discount predicted goods 52 predicted to start being sold as clearance goods within a predetermined time from a current time. That is, the discount predicted goods 52 are predicted as three goods of a tuna assorted sashimi whose predicted discount rate is 30%, various salads whose predicted discount rate is 20% and dumplings whose predicted discount rate is 10%. In addition, a "map" button 56 is on a right side of a field of the store name 51, and when the "map" button 56 is clicked, a map indicating a location of the store A is displayed.

Furthermore, when the store name 51 is a store B, various meats whose predicted discount rate is 30% are predicted as the discount predicted goods 52. In addition, ΔΔΔ daily food is also predicted to be sold as limited-time sale goods 53 predicted to start being sold for limited time sale within the predetermined time from the current time. In addition, various types of sashimi are predicted as sold-out predicted goods 54 which have been discount predicted goods yet are predicted to be already sold out at the current time.

Furthermore, when the store name 51 is a store C, the store C is a store predicted to sell clearance goods sale, yet does not start sale within the predetermined time from the current time or does not have clearance goods related to a corresponding goods field, and a non-clearance prediction notification 55 indicating, for example, "there is no clearance information" is displayed. In addition, a "view more" button 57 is displayed at a lower center of the screen. By tapping (or clicking) this "view more" button 57, the screen switches to a screen which displays clearance prediction information related to different stores.

In addition, it is desirable that, according to a display order related to each store of the clearance prediction information screen 50 in FIG. 3, stores at which the client has previously purchased goods are displayed preferentially. Hence, it is desirable that, when the electronic receipt center 3 searches nearby stores predicted to sell clearance goods, stores are edited again to an order of stores having past purchase history information of the source client who is the clearance prediction information inquiry, and the clearance prediction information is transmitted to the inquiry source mobile terminal 1.

Thus, when the display order of clearance prediction information of each store is determined based on the past purchase history of the client, a chance that goods matching a client's preference can be purchased is predicted to be high. When information related to nearby stores at which the client has not previously purchased goods needs to be checked, the screen can be switched to a next screen by scrolling the screen downward or tapping (or clicking) the "view more" button 57 illustrated in FIG. 3. Furthermore, when there is no store having the past purchase history of the client as a search result of the stores near the current location of the client, information related to stores at which the client has not previously purchased goods is displayed from a head of the clearance prediction information screen 50. In this case, the stores are desirably displayed in order from a store closer to the current location of the client. In addition, this case occurs when a new goods field which is not purchased by the client near the current location is designated, or the client is at a travel destination or a business trip destination.

In addition, the display order of the clearance prediction information of the electronic receipt center 3 may be an order that the inquiry source client has previously purchased goods a larger number of times, or an order of stores at shorter distances from the current location. Furthermore, an order to display predicted clearance goods may be an order of goods purchased as clearance goods in the past a greater number of times, may be edited to an order from a higher predicted discount rate, or specific goods (e.g., purchased goods purchased within past one week) designated in advance among predicted clearance goods may be excluded depending on cases.

According to a clearance prediction information editing method of the above electronic receipt center 3, the client may designate the editing method from the mobile terminal 1 in case of a clearance prediction information inquiry from the mobile terminal 1 or may set and register the editing method to the electronic receipt center 3. Alternatively, the client who has visually checked the clearance prediction information screen 50 in FIG. 3 displayed on the screen of the mobile terminal 1 may operate the screen to rearrange or delete the display order based on the clearance prediction information from the electronic receipt center 3. In such a case, according to the clearance prediction information editing method for the client, a final screen display result may be transmitted to the electronic receipt center 3 to cause the electronic receipt center 3 to learn the result. Alternatively, depending on cases, instead of the electronic receipt center 3, the mobile terminal 1 may have a function of editing a display order of clearance prediction information of the clearance prediction information screen 50.

Furthermore, not only a goods field which is a clearance goods inquiry target but also information for designating goods may be added as search target goods to clearance prediction information inquiry information to be transmitted by the client from the mobile terminal 1 to the electronic receipt center 3. In such a case, the electronic receipt center 3 can accurately extract only stores which are predicted to sell goods designated as search target goods, from stores existing near the current location of the client. Furthermore, not only one search target goods is designated, but also a plurality of goods may be designated.

In addition, the clearance prediction information screen 50 illustrated in FIG. 3 first displays a store name, and then display predicted clearance goods which are predicted to be sold in the store and a predicted discount rate as breakdowns. However, when, for example, specific search target goods are designated as described above, a display order is reversed, the predicted clearance goods are displayed first, and then store names which sell the search target goods, and predicted discount rates of the stores may be displayed as breakdowns.

(Description of Operation of Embodiment)

Next, an one example of an operation of the electronic receipt system 10 illustrated in FIG. 1 in a case where predicted clearance goods whose discount sale is predicted at stores near the current location of the client are found by using electronic receipt information, and are displayed on the screen on the mobile terminal 1 of the client to present to the client will be described in detail.

Figure 4:
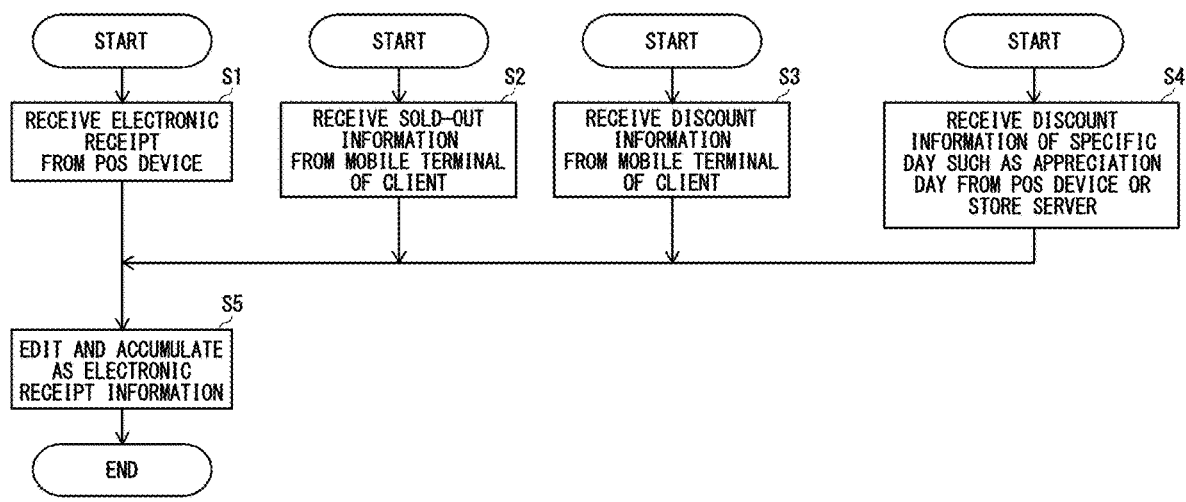
FIG. 4 is a flowchart for explaining one example of the operation of accumulating the electronic receipt information in the electronic receipt center of the electronic receipt system illustrated in FIG. 1.

First, an operation of accumulating electronic receipt information in the electronic receipt center 3 will be briefly described first. FIG. 4 is a flowchart for explaining one example of the operation of accumulating the electronic receipt information in the electronic receipt center 3 illustrated in FIG. 1.

According to the flowchart in FIG. 4, when an electronic receipt sent from the POS device 2 of each store is received (step S1), the received electronic receipt is edited as appropriate, and is accumulated as electronic receipt information per store (step S5). In this regard, when discounted clearance goods are purchased at each store, the electronic receipt sent from the POS device 2 is an electronic receipt having a format including purchase information related to the clearance goods as illustrated in FIG. 5.

Figure 5:
FIG. 5 is a schematic view illustrating an example of a printed receipt related to purchased clearance goods of the POS device illustrated in FIG. 1.

FIG. 5 is a schematic view illustrating an example of a printed receipt related to purchased clearance goods of the POS device 2 illustrated in FIG. 1, and illustrates one example of information imported to the electronic receipt. That is, the electronic receipt generally imports all pieces of information of the printed receipt. The printed receipt example illustrated in FIG. 5 includes store information 61, clearance goods information 62, a total amount 63, register information 64 and card information 65.

In the printed example in FIG. 5, the store information 61 is information related to a store at which clearance goods are purchased, and includes information related to a store name which is the store B of a BB company, a contact address telephone number, and a FAX number. Furthermore, the clearance goods information 62 includes a goods name of purchased clearance goods, a unit price after discount, quantities, a total price, a regular price (net price), a discount rate, a discount amount, a discount rate and limited-time sale information. In a case of the example in FIG. 5, the goods whose goods name is ΔΔΔ daily food is limited-time sale goods, a unit price per 100 g is 128 yen, and a total price is 302 yen. The goods whose goods name is a chicken breast meat is discounted goods and is purchased at a price discounted by 89 yen of 30% in discount rate from 298 yen in regular price.

Furthermore, the total amount 63 is a total amount of purchased goods, and is 509 yen after 2 yen is discounted as a shopping bag discount when the goods information 62 of the clearance goods are the above two goods. Furthermore, the register information 64 includes a register number at which payment processing has been performed, a cashier nomination, a purchase date, a purchase time and a purchase day of week. Furthermore, the card information 65 is information related to a credit card.

In addition, when information related to the clearance start time of clearance goods is not printed unlike FIG. 5, the oldest purchase time related to the clearance goods (e.g., the chicken breast meat in the case in FIG. 5) in a receipt of the same purchase date is regarded as a clearance start time. In this regard, when preciseness of the clearance start time does not matter, a clearance start time zone may be distinguished based on a range of the time zone in units of one hour.

Furthermore, the POS device 2 of the store desirably organizes information included in an electronic receipt, organize the example in FIG. 5 as Goods name: daily food, limited-time sale, unit price 128 yen, total price 302 yen Goods name: chicken breast meat, discount rate 30%, regular price 298 yen, discount amount 89 yen, and transmits the information in the integrated format to the electronic receipt center 3.

Figure 6B:
FIG. 6B illustrates the example of the receipt printed by print data.

However, the electronic receipt transmitted from the POS device 2 of the store to the electronic receipt center 3 usually takes a format of print data transmitted to a receipt printer which prints and outputs the receipt in the POS device 2 as illustrated in FIGS. 6A and 6B. FIGS. 6A and 6B are explanatory views illustrating an example of a general data format of the electronic receipt transmitted from the POS device 2 illustrated in FIG. 1 to the electronic receipt center 3. FIG. 6A illustrates the example of the print data taking the format which can be printed by the receipt printer, and FIG. 6B illustrates the example of the receipt printed by print data in FIG. 6A.

In this regard, the receipt in FIG. 6B has different receipt display contents per store, and therefore the receipt print data in FIG. 6A also employs a different data configuration per store. Hence, data contents transmitted as the electronic receipt from the POS device 2 of each store also differs per store. Therefore, the electronic receipt center 3 needs to analyze each electronic receipt, and analyze what each data element means, and edit each electronic receipt again.

Recent development of an analysis technique of a computer is remarkable, so that data which can be identified by a person by viewing the data can be analyzed by the computer, too. Consequently, in step S5 in FIG. 4, the necessary information can be extracted even from receipt print data in FIG. 6A and imported.

For example, it is analyzed that, among print data illustrated in FIG. 6A, data in the first row is data corresponding to the store information 61 illustrated in FIG. 5, items of data in the third row and the fourth row and items of data in the sixth row and the seventh row are items of data corresponding to the clearance goods information 62 illustrated in FIG. 5, items of data in the ninth row and the tenth row are items of data corresponding to the total amount 63 illustrated in FIG. 5, and items of data in the eleventh row and the twelfth row are items of data corresponding to the register information 64 illustrated in FIG. 5, and these items of data are edited as electronic receipt information related to the store and accumulated.

In addition, the client who purchases goods can additionally register new information to the electronic receipt information accumulated in the electronic receipt center 3. When, for example, learning that there are clearance goods at a certain store or clearance goods are being offered, the client can also operate the mobile terminal 1, access the electronic receipt center 3, invoke the electronic receipt related to the client who has previously purchased at the store, and add information related to clearance information to register.

FIG. 7 is a schematic view illustrating an example where new information related to clearance information is additionally registered to electronic receipt information accumulated in the electronic receipt center 3 by operating the mobile terminal 1 illustrated in FIG. 1. FIG. 7(A) illustrates an example where the client operates the mobile terminal 1 to display on the screen the electronic receipt of the client at the store B accumulated in the electronic receipt center 3. An "additional information input" button 71 is displayed on a lower side of the screen in FIG. 7(A).

When the client taps (or clicks) the "additional information input" button 71 in FIG. 7(A), a new screen including selection fields of goods names 72 and additional information 73 is additionally displayed as an additional information input screen as illustrated in FIGS. 7(B), 7(C) and 7(D). The client can add and additionally register new clearance information related to the store in the electronic receipt center 3 by using a newly displayed additional input screen.

FIG. 7(B) illustrates that clearance goods are added and registered, and illustrates an example where a ▼ button of the goods name 72 is tapped (or clicked) to select, for example, "all items of sashimi", a ▼ button of the additional information 73 is tapped (or clicked) to select "clearance" to additionally register information indicating that all items of sashimi are clearance goods, in the electronic receipt center 3. In addition, discount rates related to the clearance goods are not illustrated in FIG. 7. However, when "clearance" is selected from the additional information 73, a discount rate selection screen is further displayed, so that the client can select and input one of discount rates.

Furthermore, FIG. 7(C) illustrates that information indicating that clearance goods is sold out is added and registered, and illustrates an example where the ▼ button of the goods name 72 is tapped (or clicked) to select, for example, "sashimi", and the ▼ button of the additional information 73 is tapped (or clicked) to select "sold-out" and additionally register information indicating that all items of sashimi have been sold out, in the electronic receipt center 3.

Furthermore, FIG. 7(D) illustrates that information indicating that there is no clearance goods is added and registered, the ▼ button of the goods name 72 is tapped (or clicked) to select, for example, "daily food", and the ▼ button of the additional information 73 is tapped (or clicked) to select "no clearance" and additionally register information indicating that daily foods does not become clearance goods, in the electronic receipt center 3.

Each store which sells goods not only discounts and sells the goods as clearance goods, but also sets specific days such as an appreciation day and a happy day as special days for discount every month to promote sale. Information related to these specific days can be added and registered as new information related to clearance information from the POS device 2 of the store, a store server or a dedicated server of a store operation company to the electronic receipt center 3.

FIG. 8 illustrates a table illustrating an example of setting information related to a specific day decided as a special day for discount at each store. As illustrated in FIG. 8, the information related to the specific days registered in the electronic receipt center 3 includes a store name 81, a specific day name 82, a discount rate 83 and an event day 84. When, for example, the store name 81 is the store B, the specific day name 82 is the "appreciation day", and two days of 20th and 30th of every month indicated in the event day 84 are set as special days for discounting designated goods by 5% as indicated in the discount rate 83 and selling the goods.

As described above, not only electronic receipts from the POS device 2 of each store, but also discount information from the mobile terminal 1 of the client who purchases goods and information related to specific days set as special days for sale by each store are also transmitted as information related to clearance goods to the electronic receipt center 3.

Back to description of the flowchart in FIG. 4, when receiving goods sold-out information directly transmitted from the mobile terminal 1 of the client (step S2), the electronic receipt center 3 classifies the received sold-out information per store, and accumulates the sold-out information together with received time information as electronic receipt information (step S5). Furthermore, when goods discount information directly transmitted from the mobile terminal 1 of the client is received (step S3), the received discount information is also classified per store, and is accumulated as electronic receipt information together with time information (step S5). Furthermore, when discount information of a specific day such as the appreciation day directly transmitted from the POS device 2 of each store or the store server of each store is received (step S4), the received discount information of the specific day is also classified per store and accumulated as the electronic receipt information (step S5).

Figure 9A:
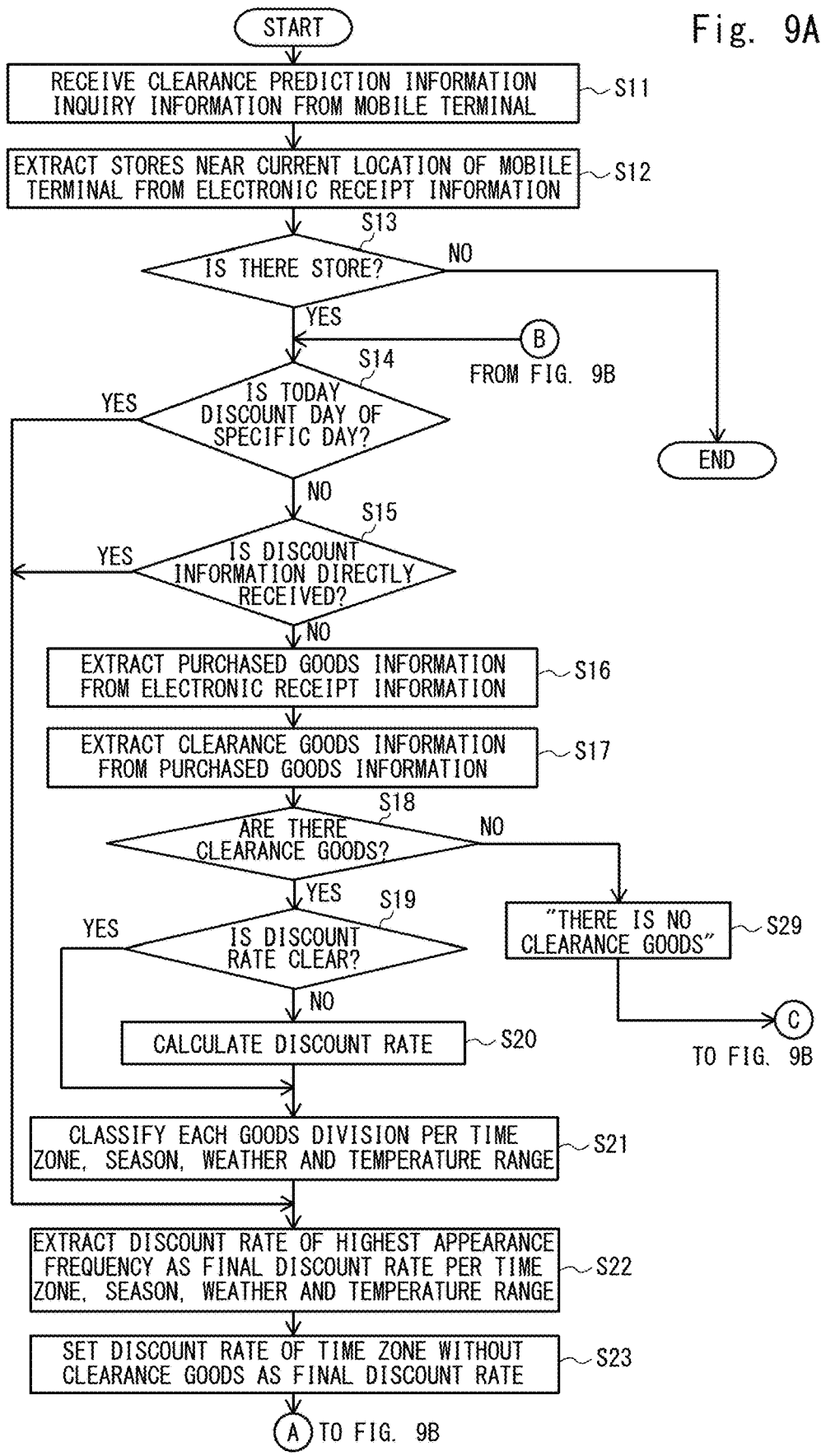
FIG. 9A is flowchart (the first half) illustrating an operation example of the electronic receipt center of the electronic receipt system illustrated in FIG. 1.

Next, an example of an operation of the electronic receipt center 3 in a case where a clearance prediction information inquiry is received from the mobile terminal 1 of the client will be described with reference to flowcharts in FIGS. 9A and B. FIGS. 9A and B are flowcharts illustrating an operation example of the electronic receipt center 3 of the electronic receipt system 10 illustrated in FIG. 1. FIGS. 9A and B illustrate the example of the operation of finding predicted clearance goods whose discount sale is predicted at stores near a current location of the client by using electronic receipt information, and generating clearance prediction information by taking into account conditions such as a time zone, a season and a weather in response to the inquiry from the mobile terminal 1 of the client.

According to the flowcharts in FIGS. 9A and B, when receiving from the mobile terminal 1 of the client a clearance prediction information inquiry for inquiring whether or not there are stores predicted to sell clearance goods among stores near the current location (step S11), the electronic receipt center 3 first extracts the nearby stores existing within a predetermined range from the current location of the mobile terminal 1, from the accumulated electronic receipt information based on GPS information of the mobile terminal 1 included in the clearance prediction information inquiry (step S12).

When there is no nearby store existing within the predetermined range from the current location of the mobile terminal 1 (NO in step S13), processing is finished, and information indicating that there is no store which sells clearance goods nearby is notified to the inquiry source mobile terminal 1.

By contrast with this, when there are the nearby stores existing within the predetermined range from the current location of the mobile terminal 1 (YES in step S13), one of the stores is selected, i.e., for example, the closest store to the current location of the mobile terminal 1 is selected to decide whether or not today is a special day for discount of a goods field (e.g., groceries) designated by the clearance prediction information inquiry information such as a specific day like the appreciation day at a target store (step S14). When today is the specific day for discount (YES in step S14), there are discount target goods corresponding the clearance goods, and processing moves to step S22.

On the other hand, when today is not the specific day for discount (NO in step S14), whether or not discount information related to a goods field (e.g., groceries) designated by the clearance prediction information inquiry information and related to a target store is directly received from the mobile terminal 1 of the client today (step S15). When the discount information is directly received from the mobile terminal 1 of the client (YES in step S15), there are discount target goods corresponding to clearance goods, and the processing moves to step S22.

On the other hand, when the discount information is not directly received from the mobile terminal 1 of the client (NO in step S15), past purchase goods information related to the goods field (e.g., groceries) designated by the clearance prediction information inquiry information is extracted from the accumulated electronic receipt information (step S16). Then, clearance goods information of discounted goods is further extracted from the extracted purchase goods information (step S17).

In this regard, when there is no clearance goods information of the goods field (e.g., groceries) designated by the clearance prediction information inquiry information (NO in step S18), "no clearance goods" is set to the target store (step S29), and the processing moves to step S27 to search information of a next nearby store.

Furthermore, when there is the clearance goods information of the goods field (e.g., groceries) designated by the clearance prediction information inquiry information (YES in step S18), whether or not discount rates are clearly set to the extracted clearance goods information is checked next (step S19). When the discount rates are clearly set (YES in step S19), the processing skips the next processing step, and moves to step S21. However, when the discount rates are not clearly set (NO in step S19), the discount rates of the clearance goods information are calculated and set (step S20).

Figure 10:
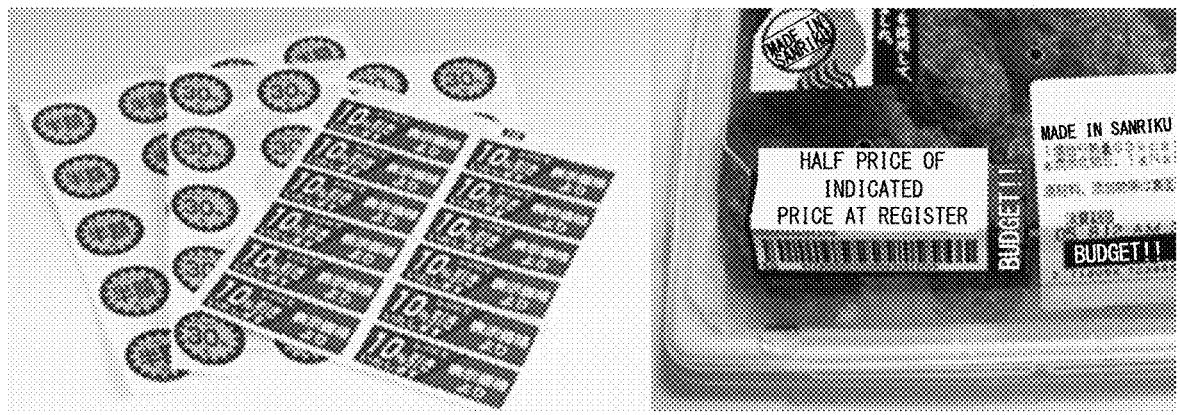
FIG. 10 is a schematic view illustrating an example of a case where discount rates are set as discount information of clearance goods.
Figure 11:
FIG. 11 is a schematic view illustrating one example of a case where discount amounts are set as discount information of clearance goods

The discount information generally includes a case where a discount rate is set to a net price for discounting as illustrated in, for example, FIG. 10, and a case where a discount amount is set for discounting as illustrated in, for example, FIG. 11. FIG. 10 is a schematic view illustrating an example of a case where discount rates are set as discount information of clearance goods, and illustrates an example of a case where discount rates are displayed as discount stickers applied to clearance goods. Furthermore, FIG. 11 is a schematic view illustrating one example of a case where discount amounts are set as discount information of clearance goods, and illustrates an example of a case where discount amounts are displayed as discount stickers applied to clearance goods.

When the discount amount illustrated in FIG. 11 is used, the discount rate fluctuates based on an original net price. Therefore, when comparison is made with clearance goods of multiple stores, it is difficult for the client to decide a discount effect. Therefore, it is desirable to convert the discount amount of clearance goods to which the discount amount illustrated in FIG. 11 is set, into a discount rate to set again. The discount amount can be easily converted into the discount rate when information related to the original net price (regular price) is set. When, for example, a discount amount is set instead of a discount rate similar to limited-time sale targeting at a plurality of goods, conversion into discount rates is bothersome.

For example, in a case of the above electronic receipt information related to clearance goods illustrated in FIG. 5 and in a case of goods such as daily food which become limited-time sale targets and are discounted, information of the original net prices (regular prices) is unknown. Therefore, the discount rates cannot be calculated in this case. Hence, a target store collects other pieces of electronic receipt information of clearance goods such as daily food which are discounted as limited-time sale targets.

Figure 12:
FIG. 12 is a schematic view illustrating an example of a printed receipt indicating that goods such as daily food which is a target on a different day from that in FIG. 5 is discounted.

In this regard, net prices are unknown, and therefore issuing dates of other pieces of collection target electronic receipt information are desirably dates within a predetermined period of issuing dates of the electronic receipt information whose discount rates cannot be calculated. As a result of search for other electronic receipts, for example, electronic receipt information illustrated in FIG. 7(D) indicating that goods whose the goods name 72 is daily food is in a state of "no clearance", and electronic receipt information illustrated in another FIG. 12 are collected. FIG. 12 is a schematic view illustrating an example of a printed receipt indicating that goods such as daily food which is a target on a different day from that in FIG. 5 is discounted, and illustrates an example where the receipt is imported as electronic receipt information.

FIG. 13 illustrates an example of a plurality of pieces of collected electronic receipt information of target clearance goods such as daily food. FIG. 13 is an explanatory view illustrating a list of a plurality of pieces of collected electronic receipt information of target clearance goods such as daily food. FIG. 13 illustrates information set to each field of a goods division field 91, a goods name field 92, a net price field 93, a purchase price field 94, a discount amount field 95, a discount rate field 96 and a unit price field 97 of electronic receipt information.

FIG. 13(A1) of FIG. 13(A) illustrates information related to electronic receipt information of a limited-time sale day (Sep. 24, 2015) illustrated in FIG. 5. FIG. 13(A2) illustrates information related to electronic receipt information of a day (Oct. 10, 2015) illustrated in FIG. 12. FIG. 13(A3) illustrates information related to electronic receipt information of a no-clearance day (Jun. 8, 2015) illustrated in FIG. 7.

Furthermore, FIGS. 13(B2) and 13(B3) of FIG. 13(B) are the same as FIGS. 13(A2) and 13(A3), respectively. However, FIG. 13(B1) illustrates a state where a discount rate is calculated referring to other electronic receipt information (i.e., electronic receipt information in FIG. 13(A2)), and is additionally set to the discount rate field 96. In addition, items which are not set to the electronic receipt information are displayed as blank fields.

Further description is as follows. As illustrated in FIG. 13(A1), the discount rate of goods such as daily food purchased during limited-time sale illustrated in FIG. 5 is unknown as indicated in the discount rate field 96. Hence, by referring to information related to the goods such as daily food in FIG. 13(A2) collected as electronic receipt information on another day, it is possible to estimate and set a discount rate of the goods such as the daily food purchased during the limited-time sale illustrated in FIG. 5.

That is, the discount rate 50% and the unit price 92 yen indicated in the discount rate field 96 and the unit price field 97 related to the goods such as the daily food in FIG. 13(A2) are used first to calculate a net price per unit (e.g., 100 g) of the goods such as the daily food in FIG. 13(A2).

Net price per unit=unit price 92 yen/discount rate 50%=184 yen

Next, the calculated net price 184 yen is regarded as a net price related to the goods such as the daily food in FIG. 13(A1). The unit price 128 yen indicated in the unit price field 97 related to the goods such as the daily food in FIG. 13(A1) is used to calculate a discount rate related to the goods such as the daily food in FIG. 13(A1).

Discount rate=100%×{1−(unit price 128 yen/net price 184 yen)}≈30%

The calculated discount rate 30% is regarded as a discount rate of the goods such as the daily food purchased during the limited-time sale illustrated in FIG. 5 to set "30" to the discount rate field 96 as illustrated in FIG. 13(B1).

Figure 9B:
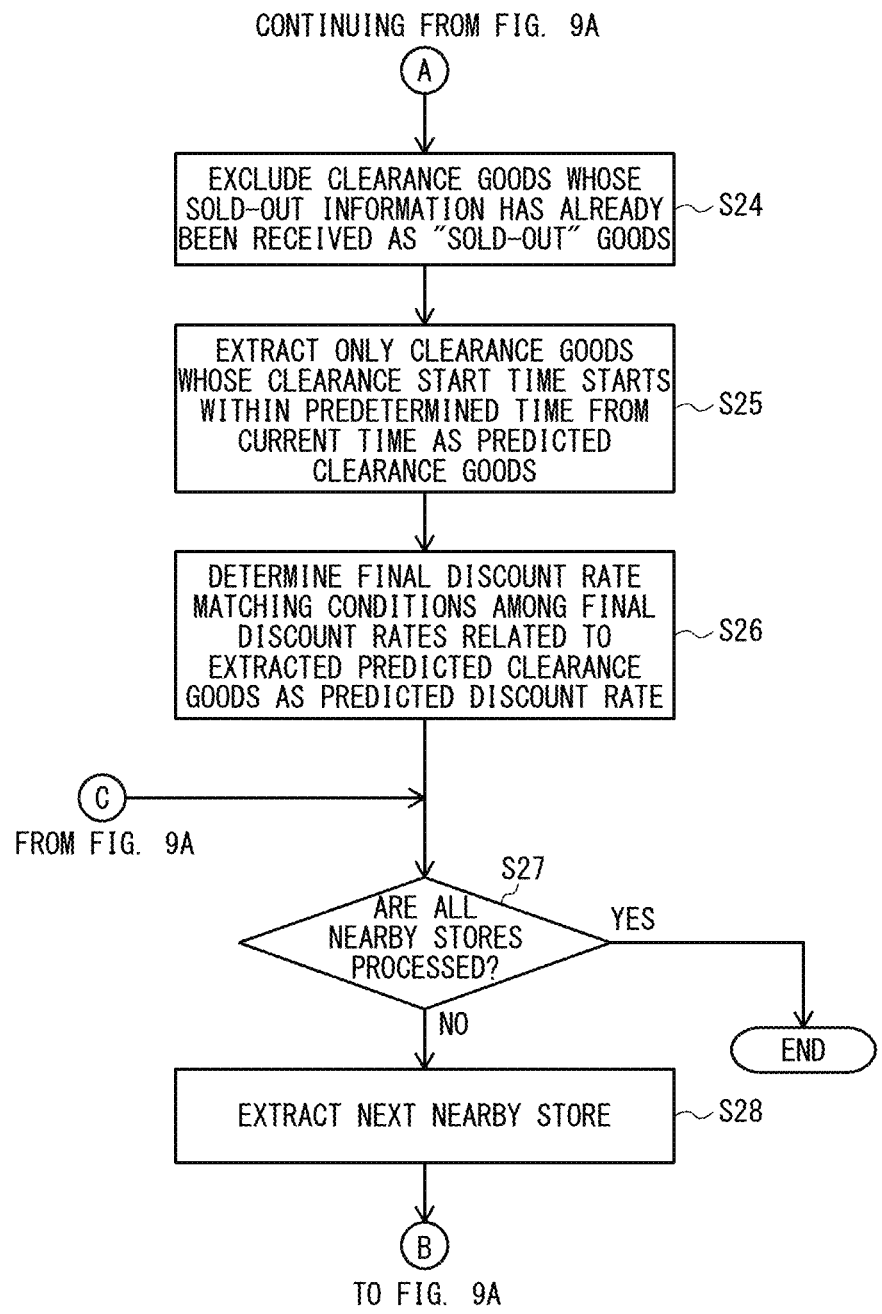
FIG. 9B is flowchart (the second half continuing from FIG. 9A) illustrating an operation example of the electronic receipt center of the electronic receipt system illustrated in FIG. 1.

Next, back to description of the flowcharts in FIGS. 9A and 9B, the discount rate calculated in the above procedure is estimated as a discount rate related to the clearance goods information and is set to the clearance goods information whose discount rate is unknown in step S20.

When setting the discount rate is finished, information related to the weather and the temperature is subsequently acquired, and data of a discount rate per date, time zone, weather and temperature range is classified as illustrated in FIG. 14 to check a distribution of a discount rate per season and time zone taking into account conditions such as the weather and the temperature per target store and goods division. In addition, in a case of a goods division which is less likely to depend on the weather and the temperature, the conditions related to the weather and the temperature may be excluded to classify data per date and time zone. FIG. 14 is an explanatory view illustrating an example where a discount rate of each time zone is classified per date, weather and temperature range of clearance goods of each target store and each goods division, and excludes the conditions, per weather and temperature range, for ease of description.

In the example illustrated in FIG. 14, values of discount rates for three days of the clearance goods such as the daily food illustrated in FIG. 13 are indicated per purchase time zone. That is, a discount rate 0% of electronic receipt information on a non-clearance day (Jun. 8, 2015), a discount rate 30% estimated from another electronic receipt information in electronic receipt information on a limited-time sale day (Sep. 24, 2015) in which a discount rate is unknown, and a discount rate 50% of a day (Oct. 10, 2015) in which the discount rate is indicated are indicated in fields of time zones corresponding to respective purchase time zones.

Back to description of the flowcharts in FIGS. 9A and 9B again, when classification of the discount rate is finished, a distribution of discount rates per time zone is checked next to extract a discount rate of the highest appearance frequency as a final discount rate in each time zone (step S22).

Figures 15A, 15B:
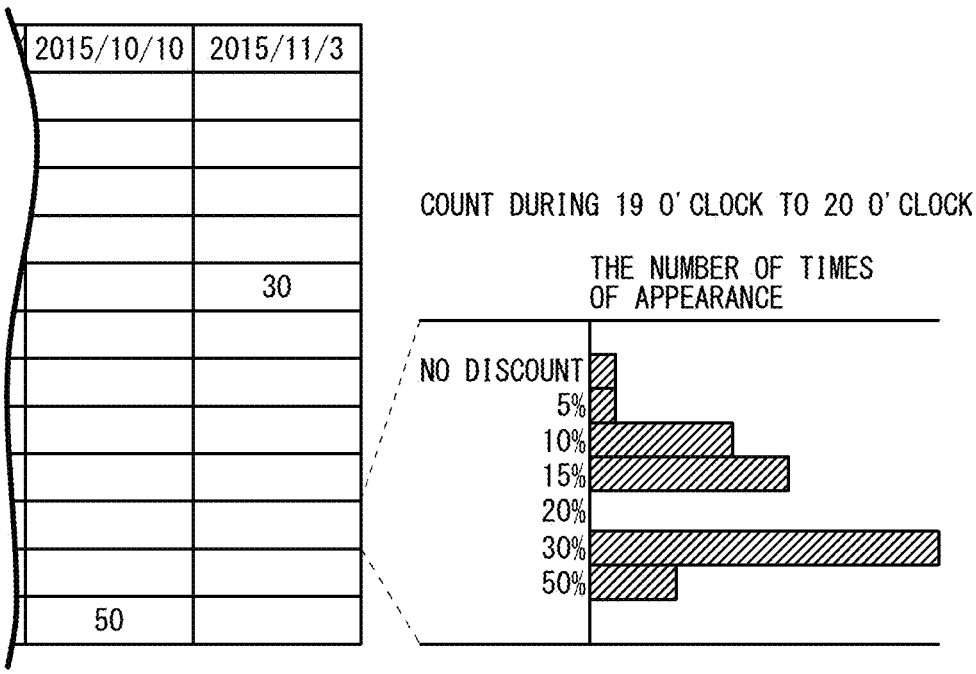
FIG. 15A is explanatory views illustrating examples of results acquired by counting a distribution of discount rates in each time zone per season, weather and temperature range of clearance goods of each target store and each goods division.
FIG. 15B illustrates a histogram illustrating an example of a distribution of an appearance frequency of a discount rate.

In addition, it is desirable to calculate a distribution of discount rates from which discount rates on specific days such as the appreciation day which is a singular point are excluded to calculate the appearance frequency of the discount rate. FIGS. 15A and 15B are explanatory views illustrating examples of results acquired by counting a distribution of discount rates in each time zone per season, weather and temperature range of clearance goods of each target store and each goods division. Similar to the case in FIG. 14, FIGS. 15A and 15B exclude the conditions, per weather and temperature range, for ease of description.

FIG. 15A illustrates an example where a discount rate in each time zone of a date is classified as illustrated in FIG. 14. FIG. 15B illustrates a histogram illustrating an example of a distribution of an appearance frequency of a discount rate in a certain time zone per season based on the classification result in FIG. 15A. In this regard, a display example illustrated in FIG. 15B illustrates a distribution of discount rates of target clearance goods (e.g., daily food) in a time zone from 19 o'clock to 20 o'clock in fall. In the display example in FIG. 15B, the discount rate of the highest appearance frequency is 30%. Therefore, 30% which is the final discount rate is set to a target clearance goods (e.g., daily food) field 102 in "19" (i.e., a time zone from 19 o'clock to 20 o'clock) of a time zone field 101 in FIG. 15A. Similarly, discount rates of the highest appearance frequency are set as final discount rates to other time zones and other seasons, too.

Subsequently, 0% is set as the final discount rate to a discount rate of a time zone in which there is no clearance goods (step S23). Furthermore, a corresponding time zone of clearance goods whose sold-out information has been received from the mobile terminal 1 of the client is set to "sold-out", and is excluded from a discount rate setting target (step S24). FIG. 16 illustrates a count result of the final discount rate calculated by the above procedure.

FIG. 16 illustrates a list table illustrating an example where a final discount rate of each time zone is listed per season, weather and temperature range of clearance goods of each target store and each goods division. Similar to FIGS. 14, 15A and 15B, the conditions, per weather and temperature range, are excluded for ease of description. The list table of the final discount rates illustrated in FIG. 16 is a table to which a reference is made to calculate a predicted discount rate per goods division of each season of each target store. A final discount rate and sold-out information in each time zone are set per goods division such as sashimi, meat and vegetable. In addition, as described above, the final discount rate is desirably analyzed and counted taking into account various conditions such as a day of a week, a weather, a temperature and the number of visiting customers as described above to improve a hitting ratio of the predicted discount rate.

Next, a reference is made to the created list table of the final discount rates, and the client refers to the list table of the final discount rate in FIG. 16 to narrow down goods to clearance goods which the client can purchase to extract clearance goods whose clearance start times are set within a predetermined time from the current time, i.e., only goods having time zones to which discount rates are set within a predetermined time from a current time as predicted clearance goods (step S25). Furthermore, the extracted predicted clearance goods are narrowed down to goods matching conditions such as a current weather, a temperature and a day of a week to decide the narrowed-down goods as predicted clearance goods which need to be returned to the client at the target store, and determine the corresponding final discount rate as a predicted discount rate (step S26).

Then, whether or not processing has been performed on all nearby stores is decided (step S27). In a case where the processing with respect to all nearby stores has been finished (YES in step S27), the processing moves to an operation of returning the predicted clearance goods and the predicted discount rate extracted per nearby store to the mobile terminal 1 which has transmitted the clearance prediction information inquiry to, for example, cause the clearance prediction information screen 50 illustrated in FIG. 3 to display the screen and notify the client. On the other hand, when the processing with respect to all nearby stores is not finished (NO in step S27), electronic receipt information related to the next nearby store is extracted (step S28), and the processing returns to the processing in step S14 and repeat the same processing.

In addition, the above description is the case where, when the mobile terminal 1 of the client transmits a clearance prediction information inquiry, the electronic receipt center 3 generates clearance prediction information and returns the clearance prediction information to the inquiry source mobile terminal 1. However, the present invention is not limited only this case. Even when, for example, there is no clearance prediction information inquiry from the mobile terminal 1 of the client, the electronic receipt center 3 may transmit clearance prediction information to the mobile terminal 1 of the client as push service. When the push service is carried out, there may be prepared a mechanism which automatically notifies the electronic receipt center 3, too, of position information indicating a current location of the mobile terminal 1 acquired when some application implemented in the mobile terminal 1 is used.

(Description of Effect of Embodiment)

As described above in detail, according to the present embodiment, by operating the mobile terminal 1 and transmitting an inquiry to the electronic receipt center 3 of the electronic receipt system, the client who tries to purchase clearance goods can predict at what discount rate clearance goods are sold at nearby stores existing in a range close to the current location of the client, and receive a return of clearance prediction information, so that it is possible to acquire an effect that it is possible to efficiently purchase clearance goods. In addition, stores existing on a route from a current location of the client to a movement destination such as home can be also designated as nearby stores.

The configuration of the preferred embodiment of the present invention has been described. However, it should be borne in mind that the above embodiment is simply an exemplary embodiment of the present invention and by no means limits the present invention. One of ordinary skill in art can easily understand that the embodiment can be variously modified according to specific use without departing from the scope of the present invention.

Further, the present invention has been described as a hardware configuration in the above embodiment. However, the present invention is not limited to this. The present invention can also realize arbitrary processing by causing a CPU (Central Processing Unit) to execute a computer program. Further, the above program can be stored by using various types of non-transitory computer readable media, and be supplied to a computer. The non-transitory computer readable media include various types of tangible storage media. The non-transitory computer readable media include, for example, magnetic recording media (e.g., flexible disks, magnetic tapes and hard disk drives), magnetooptical recording media (e.g., optical magnetic disks), CD-ROMs (Read Only Memory), CD-Rs, CD-R/Ws and semiconductor memories (e.g., mask ROMs, PROMs (Programmable ROM), EPROMs (Erasable PROM), flash ROMs and RAMs (Random Access Memory)). Further, the programs may be supplied to the computers via various types of transitory computer readable media. The transitory computer readable media include, for example, electrical signals, optical signals and electromagnetic waves. The transitory computer readable media can supply the programs to the computers via wired communication channels such as electrical cables or optical fibers or wireless communication channels.

REFERENCE SIGNS LIST

1 MOBILE TERMINAL
2 POS DEVICE
3 ELECTRONIC RECEIPT CENTER
10 ELECTRONIC RECEIPT SYSTEM
11 TRANSMISSION/RECEPTION UNIT
12 DISPLAY UNIT
13 INPUT UNIT
14 ELECTRONIC MONEY INFORMATION
15 ELECTRONIC RECEIPT TRANSMISSION DESTINATION INFORMATION
16 MEMORY
17 CONTROL UNIT
18 POWER SUPPLY UNIT
19 GPS UNIT
20 STORE
30 CLOUD
50 CLEARANCE PREDICTION INFORMATION SCREEN
51 STORE NAME
52 DISCOUNT PREDICTED GOODS (CLEARANCE PREDICTED GOODS)
53 LIMITED-TIME SALE GOODS
54 SOLD-OUT PREDICTED GOODS
55 NON-CLEARANCE PREDICTION NOTIFICATION
56 "MAP" BUTTON
57 "VIEW MORE" BUTTON
61 STORE INFORMATION
62 CLEARANCE GOODS INFORMATION
63 TOTAL AMOUNT
64 REGISTER INFORMATION
65 CARD INFORMATION
71 "ADDITIONAL INFORMATION INPUT" BUTTON
72 GOODS NAME
73 ADDITIONAL INFORMATION
81 STORE NAME
82 SPECIFIC DAY NAME
83 DISCOUNT RATE
84 EVENT DAY
91 GOODS DIVISION FIELD
92 GOODS NAME FIELD
93 NET PRICE FIELD
94 PURCHASE PRICE FIELD
95 DISCOUNT PRICE FIELD
96 DISCOUNT RATE FIELD
97 UNIT PRICE FIELD
101 TIME ZONE FIELD
102 TARGET CLEARANCE GOODS (E.G., DAILY FOOD) FIELD

The invention claimed is:
1. An electronic receipt system comprising;
a mobile terminal owned by a client;
a point of sales (POS) device installed at a store; and
an electronic receipt center, wherein
the POS device being configured to generate receipt information related to purchased goods purchased by the client at the store as a digitized electronic receipt, and transmit the electronic receipt to the electronic receipt center, and
the electronic receipt center being configured to store the received electronic receipt, and, when receiving a transmission request of the electronic receipt from the mobile terminal of the client, transmit the stored electronic receipt related to the client to the mobile terminal of a request source, wherein
the POS device generates the electronic receipt in a format to which clearance information indicating that goods sold at a price discounted from a net price is clearance goods is further added, and
when receiving from the mobile terminal of the client a clearance prediction information inquiry for inquiring whether or not there is a store predicted to sell the clearance goods among stores existing near a current location, the electronic receipt center
searches the electronic receipt stored previously, and extracts an electronic receipt for the purchased clearance goods at a store existing near the current location of the mobile terminal of an inquiry source, and
generates clearance prediction information from the extracted electronic receipt, and transmits the clearance prediction information to the mobile terminal of the inquiry source.

2. The electronic receipt system according to claim 1, wherein the electronic receipt center classifies the extracted electronic receipt related to the clearance goods per store, season and time zone, and generates clearance prediction information, the clearance goods and a discount rate of the clearance goods whose season matches with a current season and whose start of clearance sale is within a predetermined time from a current time being set as predicted clearance goods predicted to be discounted and sold, and a predicted discount rate predicted as a discount rate of the predicted clearance goods to the clearance prediction information.

3. The electronic receipt system according to claim 1, wherein the electronic receipt center selects one of a store in a range that can be reached within a predetermined movement time from the current location, and a store existing on a route on which the client of the mobile terminal of the inquiry source moves from the current location to a movement destination as a store existing near the current location of the mobile terminal of the inquiry source.

4. The electronic receipt system according to claim 2, wherein the electronic receipt center determines as the predicted discount rate a discount rate of a highest appearance frequency in a time zone in a result of classification of the extracted electronic receipt related to the clearance goods per store, season and time zone.

5. The electronic receipt system according to claim 1, wherein, when receiving discount information of some goods, clearance information of the clearance goods or information indicating that there is not the clearance goods from the mobile terminal, or receiving information related to a special day for discount from the POS device or a store server, the electronic receipt center adds the information to the electronic receipt to store.

6. The electronic receipt system according to claim 1, wherein, when classifying the extracted electronic receipt related to the clearance goods per store, season and time zone, the electronic receipt center performs further classification taking conditions including a day of a week, a weather and a temperature into account.

7. The electronic receipt system according to claim 1, wherein, even when the electronic receipt center does not receive the clearance prediction information inquiry from the mobile terminal and when the electronic receipt center receives information indicating a current location from the mobile terminal, the electronic receipt system generates the clearance prediction information and transmits the clearance prediction information to the mobile terminal from which the current location has been notified.

8. An electronic receipt center included in an electronic receipt system comprising: a mobile terminal owned by a client; and a point of sales device (POS) device installed at a store, wherein
when the POS device generates receipt information related to purchased goods purchased by the client at the store as a digitized electronic sheet, and generates and transmits the electronic receipt in a format to which clearance information indicating that goods sold at a price discounted from a net price is clearance goods is further added, the electronic receipt center receives and stores the transmitted electronic receipt, and
when receiving from the mobile terminal of the client a clearance prediction information inquiry for inquiring whether or not there is a store predicted to sell the clearance goods among stores existing near a current location, the electronic receipt center
searches the electronic receipt stored previously, and extracts an electronic receipt for the purchased clearance goods at a store existing near the current location of the mobile terminal of an inquiry source, and
generates clearance prediction information from the extracted electronic receipt, and transmits the clearance prediction information to the mobile terminal of the inquiry source.

9. A clearance prediction management method for generating and managing clearance prediction information indicating that clearance goods discounted at a store is predicted to be sold, by using an electronic receipt system, the electronic receipt system comprising: a mobile terminal owned by a client; a point of sales (POS) device installed at a store; and an electronic receipt center on a cloud,
the POS device being configured to generate receipt information related to purchased goods purchased by the client at the store as a digitized electronic receipt, and transmit the electronic receipt to the electronic receipt center, and
the electronic receipt center being configured to store the received electronic receipt, and, when receiving a transmission request of the electronic receipt from the mobile terminal of the client, transmit the stored electronic receipt related to the client to the mobile terminal of a request source, the clearance prediction management method comprising:
at the POS device, generating the electronic receipt in a format to which clearance information indicating that goods sold at a price discounted from a net price is clearance goods is further added; and
at the electronic receipt center, when receiving from the mobile terminal of the client a clearance prediction information inquiry for inquiring whether or not there is a store predicted to sell the clearance goods among stores existing near a current location,
searching the electronic receipt stored previously, and extracting an electronic receipt for the purchased clearance goods at a store existing near the current location of the mobile terminal of an inquiry source, and
generating clearance prediction information from the extracted electronic receipt, and transmitting the clearance prediction information to the mobile terminal of the inquiry source.

10. A non-transitory computer readable medium having stored thereon a clearance prediction information management program configured to carry out the clearance prediction information management method according to claim 9 as a program that can be executed by a computer.

* * * * *

UNITED STATES PATENT AND TRADEMARK OFFICE
CERTIFICATE OF CORRECTION

PATENT NO. : 10,713,638 B2
APPLICATION NO. : 16/094389
DATED : July 14, 2020
INVENTOR(S) : Kotaro Miyata It is certified that error appears in the above-identified patent and that said Letters Patent is hereby corrected as shown below:

In the Specification

Column 21, Reference Signs List, Line 55; Delete "95" and insert --93-- therefor Signed and Sealed this
Seventeenth Day of November, 2020

Andrei Iancu
*Director of the United States Patent and Trademark Office*